United States Patent [19]

Savoit et al.

[11] 4,147,658
[45] Apr. 3, 1979

[54] COMPOSITION FOR RETARDING THE EVAPORATION OF WATER

[75] Inventors: Robert E. Savoit, Wappingers Falls; Clemence J. Henry, Newburgh, both of N.Y.

[73] Assignee: Texaco Inc., New York, N.Y.

[21] Appl. No.: 889,753

[22] Filed: Mar. 24, 1978

Related U.S. Application Data

[62] Division of Ser. No. 815,395, Jul. 13, 1977, Pat. No. 4,099,915.

[51] Int. Cl.$^2$ ............................................. B01J 1/18
[52] U.S. Cl. ................................ 252/384; 252/33.2; 252/354; 252/382; 422/43
[58] Field of Search .................. 252/384, 382, 33.2, 252/351, 353, 354; 422/43

[56] References Cited

U.S. PATENT DOCUMENTS

| | | | |
|---|---|---|---|
| 2,170,644 | 8/1939 | Nelson | 422/43 |
| 3,095,263 | 6/1963 | Eckert et al. | 422/43 |
| 3,259,503 | 7/1966 | Sprague et al. | 252/33.2 |
| 3,290,130 | 12/1966 | Assman | 252/33.2 |
| 3,431,062 | 3/1969 | Fox | 422/43 |
| 3,431,063 | 3/1969 | Fox | 422/43 |
| 3,431,064 | 3/1969 | Fox | 422/43 |
| 3,458,274 | 7/1969 | Cashman et al. | 422/43 |
| 3,464,923 | 9/1969 | Roche et al. | 252/33.2 |
| 3,549,313 | 12/1970 | Eckert et al. | 422/43 |
| 3,655,557 | 4/1972 | Marsh et al. | 252/33.2 |

FOREIGN PATENT DOCUMENTS

| | | | |
|---|---|---|---|
| 788322 | 12/1957 | United Kingdom | 252/33.2 |
| 813567 | 5/1959 | United Kingdom | 252/33.2 |
| 1396992 | 6/1972 | United Kingdom | 252/33.2 |

*Primary Examiner*—Benjamin R. Padgett
*Assistant Examiner*—Irwin Gluck
*Attorney, Agent, or Firm*—Thomas H. Whaley; Carl G. Ries; Henry W. Archer

[57] ABSTRACT

Disclosed are compositions for suppressing and/or retarding the evaporation of water from dry cooling towers. The compositions contain: from 99.5 to 99.9 wt. percent of a light lubricating oil; 0.1 to 0.5 weight percent of an alkaline earth metal sulfonate and 30 to 150 parts per million of a polyacrylate-based defoaming agent.

5 Claims, No Drawings

COMPOSITION FOR RETARDING THE EVAPORATION OF WATER

This is a division of application Ser. No. 815,395, filed July 13, 1977 now U.S. Pat. No. 4,099,915.

BACKGROUND OF THE INVENTION

1. Field of the Invention

This invention relates to a composition for retarding the evaporation of water from dry cooling towers used in power plants and other bodies of water susceptible to evaporation.

Cooling towers of this type reject waste heat from power plants directly to the atmosphere rather than to bodies of water. These towers which function as heat exchangers resemble a large farmer's harrow and consist of steel discs which rotate between hot condenser water from the power plant and the atmosphere. Rotational speeds are about 6 rpm. As the disc rotate and as air is blown over the upper portions of the discs, local sections of the discs are heated in the water and cooled in the air. Thus there is a net flow of heat from the water to the atmosphere. To prevent the discs from carrying a thin film of water up into the air stream and losing water by evaporation (and thereby defeating the purpose of a dry tower), water must be stripped off the discs. The most advantageous way of doing this is to float a layer of oil on the surface of the water. If the oil preferentially wets the disc, water will be stripped off the disc, and air-water interfaces will be eliminated. The normal operating temperatures of the towers range from 100° to 160° F. in the summer and lower in winter, as limited by the ambient air temperature.

2. Description of the Prior Art

Various compositions have been suggested and tried for retarding the evaporation of water from exposed surfaces. Thus in coassigned U.S. Pat. No. 3,459,313, there is disclosed a water evaporation retarding composition consisting of a mineral lubricant oil, trimer or dimer acid, a spreading agent, and a petroleum or natural wax. For particular application in dry cooling towers dimethyl polysiloxane and paraffinic oils, have been tried. There were found to be poor in demulsifiability, air entrainment and metal wetting characteristics.

Experimental work has shown that an evaporation retarding oil composition to be suitable for this application must fulfill certain requirements. The composition must have a specific gravity less than 1.0. It must wet the disc surface and strip water from its surface. Moreover, its cost must be relatively low because of volatilization and other losses.

Additionally, low vapor pressures are required to minimize system losses. Pressures of about 0.1 micron hg are acceptable for normal operating temperatures. This figure becomes significant as the process requires a large surface area ($10^7$ ft$^2$). Lower vapor pressure is also desirable from a flammability standpoint.

As concerns the viscosity of the oil, the lower the viscosity the better. A viscosity of 20 cst or lower allows for a fast flowing composition and a thin oil layer on the disc surfaces. A thick oil layer represents a significant thermal resistance to heat transfer, and impairs the disc performance.

With the discs continually cutting the air, water and oil interfaces, and with water flowing between the discs, energy is continually being added to the interfaces, and may generate emulsions or foam. Some oil pumping is necessary, and large water drop entering the pumps may be broken into smaller, more stable drops. Foam or emulsions are undesirable as they will increase water evaporation, increase the chance of oil traveling to the stream condenser, and will generally decrease the periodic tower's performance. Therefore a low foaming oil or an oil with nonfoaming additives is desired. Besides general compatibility, it is desired that the oil (or its additives) provide some corrosion protection for the discs.

Since the condenser water, trough, discs, and oil are potential sites for organic growth, not only must the oil not support growth, but it must be compatible with water treated to prevent organic growth. Since the oil will be exposed to chemicals and gases typical of the power plant environment, it must retain the aforementioned properties sufficiently so that constant replacement is not required.

Exposed to the air, the oil will become impregnated with dirt and dust. Typical oil cleaning mechanisms and techniques must apply to the oil.

There is thus a high degree of criticality in selecting a narrow boiling range oil of the proper viscosity along with the proper additives to furnish the other requirements for the system.

SUMMARY OF THE INVENTION

Unexpectedly, in accordance with the invention, it has been discovered that the foregoing requirements are met by a composition consisting essentially of from 99.5 to 99.9 weight percent of a light lubricating oil; 0.1 to 0.5 weight percent of an alkaline earth metal sulfonate and 30 to 150 parts per million of an acrylic defoaming agent.

The oil component of the subject compositions can be a naphthene base distillate, a paraffin base distillate or mixtures thereof which exhibit a low rate of evaporation such that upon formation of a vapor barrier film the oil will not substantially vaporize. A mineral lubricating oil having an API gravity of between 18 and 36, and a viscosity at 100° F. of 80 to 120 SUS is preferred.

The alkaline earth metal sulfonates can be an aromatic sulfonate such as a barium sulfonate in which there are two alkyl groups of from 6 to 16 carbon atoms attached to an aromatic group in a symmetrical manner.

The defoaming agent can be any polyacrylate-containing defoamer where the polyacrylate polymer has a molecular weight in the range of 25,000 to 27,000.

Preferably the defoamer will be blended with toluene, an acrylate monomer and a kerosene distillate.

The invention is further illustrated but not limited by the following Example.

EXAMPLE

An effective composition was blended from the following:

| Components | Weight Percent |
|---|---|
| Oil | 99.5 |
| Barium bis (dinonylnaphthalene sulfonate) in 50% light mineral oil | 0.5 |
| Defoamer | 50 ppm |
| | 100.0 |

The oil used had the following characterization.

| Spec. G. 60/60° F | 0.850–0.860 |

| | |
|---|---|
| API | 33.0–35.0 |
| VIS 100° F SUS | 95.0–105 |
| VIS 210° F SUS | 38.9 |
| Pour ° F | 0 |

The defoamer consisted of in percentages by volume:

8% toluene
5% acrylate monomer
54% kerosene distillate
33% polyacrylate (mol. wt. 25,000–27,000)

It is to be understood that the foregoing specific example is presented by way of illustration an explanation only that the invention is not limited by the details of the example. In addition to the application specifically disclosed herein other application will suggest themselves to those skilled in the art. Thus the composition disclosed can be used in cooling ponds and in the water used in solar collectors.

The foregoing is believed to so disclose the present invention that those skilled in the art to which it appertains can, by applying thereto current knowledge, readily modify it for various applications. Therefore, such modifications are intended to fall within the range of equivalence of the appended claims.

What is claimed is:

1. A composition for suppressing and/or retarding the evaporation of water agitated by partially air-exposed rotary surfaces comprising from 99.5 to 99.9 weight percent of a light lubricating oil; 0.1 to 0.5 weight percent of an alkaline earth metal sulfonates having two alkyl groups of from 6 to 16 carbon atoms attached to an aromatic group in a symmetrical manner, and 30 to 150 parts per million of an acrylic defoaming agent.

2. The invention as recited in claim 1 wherein said defoamer is a polyacrylate having a molecular weight in the range of 25,000 to 27,000.

3. The invention as recited in claim 1 wherein said sulfonate is barium bis(dinonylnaphthalene)sulfonate.

4. The invention as recited in claim 1 wherein said defoaming agent consists of 8 percent toluene; 5 percent acrylate monomer; 54 percent of kerosene and 33 percent of a polyacrylate polymer having a molecular weight in the range of 25,000 to 27,000.

5. The invention as recited in claim 1 wherein said oil has a viscosity at 100° F. of between 80 and 120 SUS.

* * * * *